Sept. 25, 1928.  C. R. NICHOLS  1,685,461
GEAR TRANSMISSION
Filed April 19, 1926    2 Sheets-Sheet 1
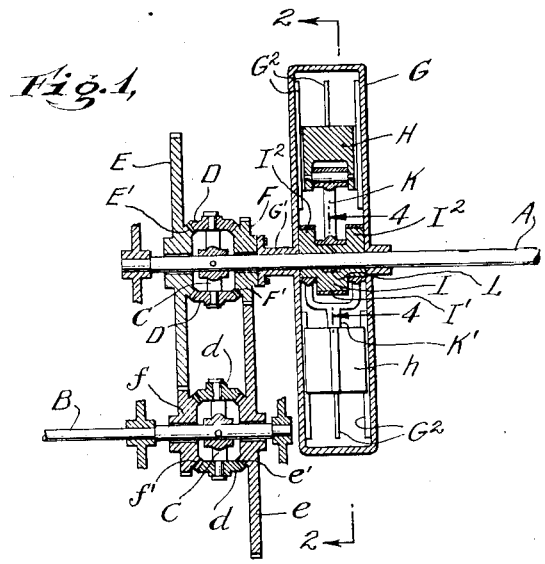
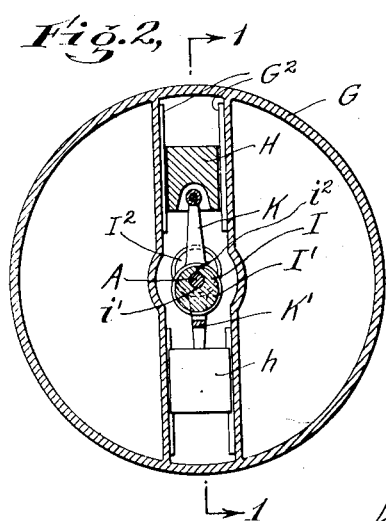
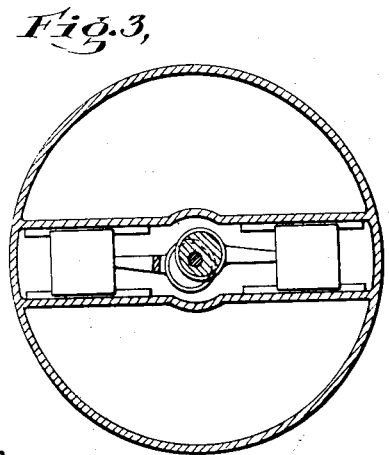
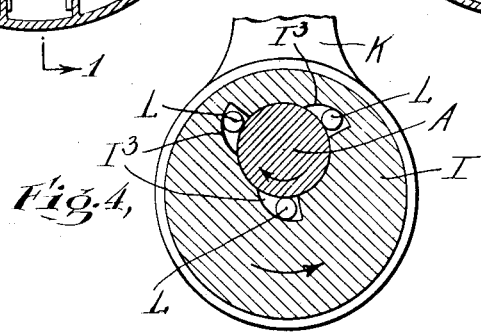
Inventor
CHARLES R. NICHOLS
By his Attorney
John E. Hubbell Sept. 25, 1928.  C. R. NICHOLS  1,685,461
GEAR TRANSMISSION
Filed April 19, 1926   2 Sheets-Sheet 2
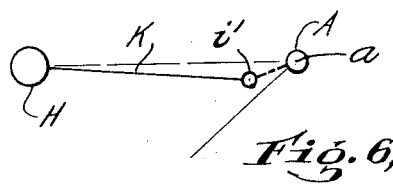
Fig. 6,
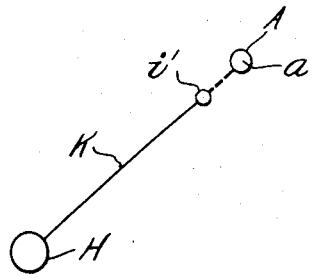
Fig. 5,
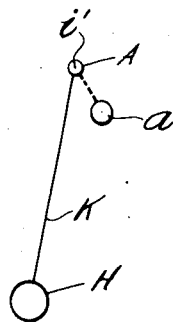
Fig. 8,
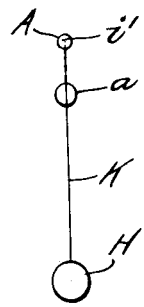
Fig. 7,
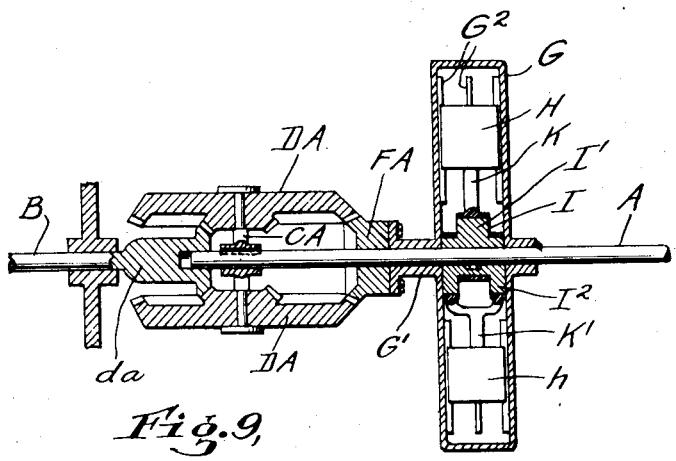
Fig. 9,
INVENTOR
CHARLES R. NICHOLS
BY
John E. Hubbell
ATTORNEY Patented Sept. 25, 1928.

1,685,461

UNITED STATES PATENT OFFICE.

CHARLES R. NICHOLS, OF NEW YORK, N. Y.

GEAR TRANSMISSION.

Application filed April 19, 1926. Serial No. 102,845.

This invention relates to geared power transmissions, and the general object of the invention is to provide simple and effective means for automatically varying the speed ratio between a driving and a driven shaft in response to variations in the load carried by the driven shaft so that the driving shaft may operate at approximately constant speed and deliver power at a constant rate notwithstanding variations in the retarding torque on the driven shaft. Stated differently, the general object of the present invention is to provide a gear transmission between a driving shaft and a driven shaft of such a character that the speed ratio between the two shafts will vary with the retarding torque on the driven shaft so that, notwithstanding such variations in torque the driving shaft may transmit power at an approximately constant rate and may run at, or approximately at a particular speed which is desirable as from the standpoint of efficiency, or from the standpoint of maximum power development by the motor by which the driving shaft is rotated.

The invention may advantageously be used with various types of driving motors, such as electric motors or steam turbines, which give the best results when operated under approximately constant speed and load conditions, and is especially well adapted for use in the case of automobiles driven by internal combustion engines. With any particular throttle adjustment of an ordinary combustion engine, most efficient and satisfactory operation is ordinarily secured with some particular engine shaft speed, and at that speed and throttle adjustment the engine will deliver power at a given rate. With the aid of the present invention, the throttle of an automobile engine may be set into the best position for the development of the power required to drive the motor car at the particular speed desired when the engine is running along a level road. Then when the car starts to run up an incline the engine crank speed will not diminish, although the speed of the motor car itself will diminish until the power required to move the car up the incline at the reduced speed does not exceed that furnished by the engine.

In accordance with the present invention, I connect the driving shaft and the driven shaft by a train of gears which will permit different relative speeds of the shafts, and which includes a gear which varies in speed relative to either shaft on a change in the speed ratio of the two shafts, and I subject said gear to a speed controlling force reacting between said gear and some other rotating element of the combination to control the speed of said gear without objectionable energy loss. In a preferred practical mode of carrying out the invention, I employ centrifugal force means to provide a reactive force action between the driving shaft and an element in the gear train which rotates at a speed which is higher than, and in the same direction as that of the driving shaft and increases with respect to the latter as the driven shaft speed decreases. With this arrangement, an increase in the retarding torque of the load carried by the driven shaft, slows down the driven shaft and increases the speed of the controlled gear until the resultant increase in the reactive force impressed on the gear stabilizes the speed of the latter, such stabilization occurring when the driven shaft speed is such that the available energy is utilized in carrying the load.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated in a somewhat diagrammatic manner various embodiments of my invention.

Of the drawings:

Fig. 1 is a section on the line 1—1 of Fig. 2;

Fig. 2 is a section on the line 2—2 of Fig. 1;

Fig. 3 is a section taken similarly to Fig. 2 but showing the parts in different relative positions;

Fig. 4 is an enlarged partial section on the line 4—4 of Fig. 1;

Fig. 5 is a diagram illustrating the operation of apparatus of the type shown in Figs. 1 to 4;

Figs. 6, 7, and 8 are diagrams illustrating different relative positions of the parts shown in Fig. 5; and Fig. 9 is a sectional elevation of a modified form of apparatus.

In Figs. 1 to 4, I have illustrated in a somewhat conventional and diagrammatic way, means constructed in accordance with the present invention for transmitting power from a driving shaft A to a driven shaft B.

The shafts A and B are connected by a gear train which comprises one or more gear wheels D journalled on a spider member C secured to the shaft A. As shown, there are two gear wheels D, one at each side of the shaft A rotating about axle portions of the spider C having coincident axes radial to the shaft A. The gears D are bevel gears, and each meshes with a bevel gear section E' of a compound gear element E journalled on the shaft A. The gear element E is provided with spur gear teeth at its periphery which mesh with the peripheral spur gear teeth of a compound gear element $f$ journalled on the driven shaft B. The gear element $f$ comprises a bevel gear portion $f'$ which meshes with one or more gears $d$ mounted on the driven shaft B. As shown, the gears $d$ are similar to the gears D and are mounted on the shaft B by means of a spider element C as the gears D are mounted on the shaft A. Journalled on the driven shaft B at the opposite side of the spider C from the element $f$ is a gear element $e$ having a bevel gear portion $e'$ in mesh with the gears $d$, and having spur gear teeth at its periphery in mesh with the peripheral spur gear teeth of a gear element F. The latter is journalled on the shaft A at the opposite side of the spider C from the element E, and comprises a bevel gear portion F' in mesh with the gears D.

With the shafts A and B connected by a differential gear train of the type described, and with the various gear elements in the train allowed to revolve freely, the rotation of the shaft A will not result in any rotation of the shaft B when the latter is subjected to a retarding force greater than any small resultant frictional drag exerted on the shaft A by the gear elements F and $e$. When, however, any one of the gear elements is subjected to the action of a suitable reactive force tending to retard or accelerate its rotative speed relative to the rotative speeds of the other rotating elements of the combination, the driven shaft B may be caused to rotate at a speed at which it will deliver all of the energy which the shaft A can deliver to it. Those skilled in the art will understand that with any given speed of rotation of the shaft A each of the various elements of the gear train will have a particular speed of rotation when the driven shaft B is held stationary, and a different particular speed of rotation for each different speed of rotation of the shaft B.

In the particular construction illustrated by way of example in Figs. 1 to 4, the gear elements E and F are counter-parts of the gear elements $e$ and $f$, respectively, and the spur gear pitch diameter of each of the elements E and $e$ is three times the spur gear pitch diameter of each of the elements F and $f$. With the gear elements relatively proportioned as described, it can be shown by simple mathematical calculation that when the driven shaft B is held stationary, the gear element F will rotate in the same direction as the shaft A, and two and a quarter times as fast as the latter. If the relative speed of rotation of the element F and shaft A is reduced the driven shaft B will start into rotation in a direction opposite to the direction of the rotation of the shaft A, at a speed dependent on, and which can be readily calculated from the rotative speed of the shaft A and the rotative speed of any one of the various gear elements. For example, with the gear pitch diameters mentioned above, if the rotative speed of the element F is made exactly double that of the rotative speed of the shaft A, the rotative speed of the shaft B will be three times that of the shaft A. It is to be understood that the elements E and F need not be counter parts of the elements $e$ and $f$, and that the gear ratios mentioned above may be varied.

In the form of my invention illustrated in Figs. 1 to 4, means are provided for subjecting the element F and the shaft A to a reactive force tending to retard the rotation of the element F and to accelerate the rotation of the shaft A, which force increases and decreases and thereby decreases and increases the speed of the shaft B relative to the shaft A automatically as the retarding torque exerted on the shaft B increases and diminishes. The means shown in Figs. 1 to 4 for this purpose, comprises a housing member B journalled on the shaft A and having a hub portion G' bolted or otherwise secured to the element F so that the housing G and element F rotate together. The housing G is formed with guideways G² for weights which tend to move along said guideways away from the shaft A under the action of centrifugal force. The weights and guideways should be arranged, of course, to avoid or minimize balance changes as a result of the movements of the weights, and as shown, there are two similar weights H and $h$ arranged at opposite sides of the shaft A, and movable radially of the shaft A in the guideways G². The radial movement of the weight H is effected and controlled by means of an eccentric body I journalled on the shaft A, and connected to the weight H by a connecting rod K pivotally connected to one end of the weight H and provided at the other end with an eccentric strap encircling the eccentric portion I' of the member I. Integral end portions of the body I form a divided eccentric I² having the same throw as the eccentric I but having its axis $i^2$ at the opposite side of the axis of the shaft A from the axis of the eccentric I'. The weight $h$ is connected to the eccentric I² by a connecting rod K' having its outer end pivotally connected to the weight H and having its inner end bifurcated and provided with an eccentric strap surrounding each half of the divided eccentric I².

The eccentric body I is free to rotate about the shaft A in the direction opposite to that in which the shaft A and the element F rotate, but means are provided for preventing rotation of the eccentric body about the shaft A in the same direction as the latter rotates. The means shown in Figs. 1 to 4 for this purpose is a ratchet clutch mechanism. This mechanism, as shown, comprises balls or rollers L received in pockets I³ formed in the wall of the passageway through the body I and shaped in the usual manner so that the members L will wedge between the outer walls of the pockets I³ and the periphery of the shaft A to hold the member I against rotation relative to the shaft A in the clockwise direction in which the shaft A is intended to rotate, while the elements L will be released and rotation in the counter clock-wise direction of the member I relative to the shaft A will be permitted whenever the member I is acted on by a force tending to produce such counter clockwise rotation.

In the diagrams shown in Figs. 5 to 8, I have assumed conditions of operation such that the gear element F rotates at twice the angular velocity of the shaft A. In Fig. 5 the parts are shown in a position in which the connecting rod K is radial to the shaft A and the axis $i'$ of the pivotal connection between the connecting rod K and the eccentric I' is between, and in the same plane with the axis of the shaft A and the center of the weight H. Fig. 6 shows the relative position of the parts after a movement of the shaft A through an angle of 45° or so, from the position shown in Fig. 5. Since the element F and housing G rotate at twice the speed of the shaft A, in Fig. 6, the weight H will be angularly advanced about the shaft A with respect to the axis $i'$ through an angle equal to the angular difference between the positions of the axis $i'$ in Fig. 5 and Fig. 6.

As will be apparent from Fig. 6, as the parts move away from the positions shown in Fig. 5, the weight H exerts a centrifugal force action on the body I tending to rotate the latter relative to the shaft A, but such relative rotation is prevented by the action of the clutch pawls L. The tangential component of the centrifugal force pull exerted by the weight H which thus tends to accelerate the rotation of the shaft A, reacts through the walls of the guideways G² on the member G and thereby on the element F, tending to accelerate the angular movement of the latter. The reactive effect between the shaft A and element F exerted by the centrifugal weight H continues until the parts reach the position shown in Fig. 7 in which the axis of the shaft A is between and in the same plane with the axis $i'$ and the center of the weight H. The actual value of the reactive force between the element F and shaft A exerted by the weight H depends of course upon the mass of the latter, and on the throw of the eccentric I', and on the length of the connecting rod K, and varies with the square of the angular velocity of the element F, and varies with changes in the angle which the axis of the rod K makes with the radial plane including the axis of the shaft A and the axis $i'$. It will be understood, of course, that if the weight $h$ is the same as the weight H, and the controlling provisions for the two weights are the same as described, the action of the weight $h$ will be a duplicate of the action of the weight H.

As the parts move out of the position shown in Fig. 7, centrifugal force causes the weight H to move tangentially with respect to the shaft A until the parts return to the position shown in Fig. 5, since the centrifugal pull action on the member I moves the latter in the counter clockwise direction permitted by the ratchet clutch mechanism, to accommodate the tangential movement of the weight H. Fig. 8 represents an intermediate position of the parts as they pass from the positions shown in Fig. 7 into that shown in Fig. 5. During the movement of the parts from the position shown in Fig. 7 through the position shown in Fig. 8 back into the position shown in Fig. 5, there is no significant interaction between the shaft A and the member F due to the weights H and $h$. During the movements of the parts last referred to the linear velocities of the weights H and $h$ are being increased and the latter are consequently then absorbing energy from the member F, and therefore are exerting a retarding tendency on the latter. The period during which the weights are unclutched from the shaft A are relatively brief however, and the total cessation of the reacting force during these periods, as well as the variations in the reactive force resulting from the changes in the angle between the connecting rods and the plane including the eccentric axes, may be smoothed out and compensated by the action of a suitable fly wheel which may be formed in whole or in part by the housing G. The fly wheel stores up and pays out energy as the reactive force decreases and increases. It will be apparent that the useful re-active force exerted by the centrifugal weights is a non-frictional force. This does not mean that the use of the apparatus will not involve ordinary friction losses, but in the operation of the apparatus such friction losses are incidental and not consequential, and any usual or suitable provisions may be made to minimize such losses.

It will be apparent from what has been said that, disregarding ordinary friction losses, the shaft A may rotate at an approximately constant speed and deliver power at an approximately constant rate to the driven shaft B notwithstanding wide variations in the retarding torque of the load carried by the latter. Since the energy delivered by the shaft B cannot exceed that received from the shaft A, any increase or decrease in the retarding torque on the shaft B necessarily results in a decrease or increase in the speed of the shaft B.

This automatic variation in the speed ratio between the driving and driven shafts in response to changes in the load carried by the driving shaft is highly advantageous for many purposes. For instance, in the case of an automobile driven by an ordinary internal combustion engine, the fuel throttle valve for the latter may be set into the position to give a desirable average speed of travel along a level road with a desirably low fuel consumption for the power which the engine is then required to develop. When the automobile starts up an incline the automobile tends to slow down, of course, but the slowing down of the automobile does not result in a change in the engine crank shaft speed and a lowered engine efficiency and power as would be the case with an ordinary transmission. In the case of some electric drives in which variable loads are carried by shunt wound motors or by induction motors which operate more efficiently and to better advantage at approximately constant speeds, a transmission constructed in accordance with the present invention can be advantageously employed to vary the speed of the driven shaft inversely with the load and thereby maintain the driving motor in operation under full load at its most desirable speed. Similarly, other motors, such as steam turbines, may be operated with advantage by the aid of the present invention to carry a variable load while developing constant power and operating at constant speed.

The principle of the present invention can be embodied in other constructions than that illustrated in Figs. 1 to 4, and in Fig. 9 I have illustrated by way of example, one of the many modifications of the apparatus shown in Figs. 1 to 3 in which the principle of the present invention is utilized. In the construction shown in Fig. 9, the shaft A carries a spider CA having axles extending radially in opposite directions away from the shaft A on which are journalled compound gears DA. The gears DA comprise small diameter bevel gear portions in mesh with a bevel gear $da$ secured to the end of the driven shaft B. The gears DA also have large diameter bevel gear portions which mesh with the bevel gear FA journalled on the shaft A and secured to the hub portion G' of the casing G. It will be apparent to those skilled in the art that the operation of the apparatus shown in Fig. 9 is identical in substance with the operation of the apparatus illustrated in Figs. 1 to 4. In Fig. 9 the gear FA varies in speed relative to the shaft A with variations in load exactly as the gear F varies in speed relative to the shaft A in the construction first described. Certain novel subject matter disclosed but not generically claimed herein is so claimed in my copending application Serial No. 156,800, filed December 24, 1926.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a power transmission, the combination with driving and driven shaft elements, of gear elements forming a differential gear train connecting said shafts and including a gear element revolving at different speeds relative to the speed of another element of the transmission with different speed ratios between the two shaft elements, and means for exerting a reactive force between said gear element and said other element comprising one or more weights each mounted on one of the two last mentioned elements and a connection between each such weight and the other of the two last mentioned elements including a crank carried by the latter and operative to move the corresponding weight toward the axis of the element on which it is mounted during each of successive increments of relative movement of the connected elements, and means for automatically adjusting the effective length of said connection at the end of each of said increments to permit the corresponding weight to move quickly outward from said axis.

2. In a power transmission, the combination with driving and driven shaft elements, of gear elements forming a differential gear train connecting said shafts and including a gear element revolving at different speeds relative to the speed of another element of the transmission with different speed ratios between the two shaft elements, and means for exerting a reactive force between said gear element and said other element comprising one or more weights mounted on one of the two last mentioned elements and a connection between each of said weights and the other of the two last mentioned elements comprising a crank and a clutch connecting said crank to the last mentioned elements, said clutch being operative to cause said crank to move the weight connected thereto toward the axis of the element by which it is carried during each of successive increments of the connected elements and operating at the end of each of said increments to release said crank and permit the corresponding weight to move outward under the action of centrifugal force.

3. In a power transmission, the combination with driving and driven shaft elements, of gear elements forming a differential gear train connecting said shafts and including a gear element coaxial with and revolving in the same direction as and more rapidly than another of the above mentioned elements but adapted to vary in rotative speed relative to said other element, and means for exerting a reactive force between the two last mentioned elements comprising one or more weights each mounted on one of the two last mentioned elements and a connection between each such weight and the other of the two last mentioned elements including a crank carried by the latter and operative to move the corresponding weight toward the axis of the element on which it is mounted during each of successive increments of relative movement of the connected elements, and means for automatically adjusting the effective length of said connection at the end of each of said increments to permit the corresponding weight to move quickly outward from said axis.

4. In a power transmission, the combination with driving and driven shaft elements, of gear elements forming a differential gear train connecting said shafts and including a gear element coaxial with and revolving in the same direction as and more rapidly than the driving shaft, but adapted to vary in rotative speed relative to the driving shaft, and means for exerting a reactive force between said gear element and said driving shaft comprising one or more weights each mounted on one of the two last mentioned elements and a connection between each such weight and the other of the two last mentioned elements including a crank carried by the latter and operative to move the corresponding weight toward the axis of the element on which it is mounted during each of successive increments of relative movement of the connected elements, and means for automatically adjusting the effective length of said connection at the end of each of said increments to permit the corresponding weight to move quickly outward from said axis.

5. In a power transmission, the combination with driving and driven shaft elements, of gear elements forming a differential gear train connecting said shafts and including a gear element coaxial with and revolving in the same direction as and more rapidly than the driving shaft, but adapted to vary in rotative speed relative to the driving shaft, and means for exerting a re-active force between said gear element and said driving shaft element comprising one or more weights mounted on one of the two last mentioned elements and a connection between each of said weights and the other of the two last mentioned elements comprising a crank and a clutch connecting said crank to the last mentioned element, said clutch being operative to cause said crank to move the weight connected thereto toward the axis of the element by which it is carried during each of successive increments of the connected elements and operating at the end of each of said increments to release said crank and permit the corresponding weight to move quickly outward from said axis.

6. In a power transmission, the combination with driving and driven shaft elements, of gear elements forming a differential gear train connecting said shafts and including a gear element revolving at different speeds relative to the speed of another element of the transmission with different speed ratios between the two shaft elements, and means connecting said gear element and said other element comprising one or more weights mounted on one of the two last mentioned elements and a connection between each such weight and the other of the two last mentioned elements including a crank mounted in the last mentioned element to turn with respect thereto about its axis, a clutch connection between said crank and the element by which it is carried operative to permit relative angular movement of the crank and element in one direction while permitting such movement in the opposite direction, and a link connection between the crank and the corresponding weight.

7. In a power transmission, the combination with driving and driven shaft elements, of gear elements forming a differential gear train connecting said shafts and including a gear element revolving at different speeds relative to the speed of another element of the transmission with different speed ratios between the two shaft elements, and means comprising a radially movable weight revolving with said gear element and a crank and a clutch intermittently connecting said weight to and disconnecting it from said other element for exerting a reactive force between said gear element and said other element which opposes the relative change in speed of the last mentioned elements occurring when the speed of the driven shaft element decreases without a corresponding reduction in the driving shaft speed.

8. In a power transmission, the combination of revoluble members, one or more centrifugal weights each mounted on one of said members so as to move toward and away from the axis of rotation of the latter along a predetermined path, one end of which is more and the other end of which is less remote from said axis than any intermediate point in said path, and a connection between each such weight and the second member including a crank carried by the latter which on a certain relative angular movement of said members causes said weight to move inward toward the axis of rotation of the member on which the weight is mounted, said connection including provisions for automatically adjusting its effective length at the end of each inward movement of said weight to thereby permit a quick outward movement of the latter.

9. In a power transmission, the combination with revoluble members of one or more centrifugal weights each mounted on one of said members so as to move toward and away from the axis of rotation of the latter along a predetermined path, one end of which is more and the other end of which is less remote from said axis than any intermediate point in said path, and a connection through which said second member moves said weight to the inner end of said path, said connection including a crank and adjusting provisions operating automatically to permit said weight to move quickly outward when said crank is in or near a position at the opposite side of said axis from said weight.

10. In a power transmission, the combination of revoluble members, one of which is formed with one or more radial guide-ways, a centrifugal weight movably mounted in each such guide-way, and a connection between each such weight and the second member including a crank carried by the latter which on a certain relative angular movement of said members causes said weight to move inward toward the axis of rotation of the member on which the weight is mounted, said connection including provisions for automatically adjusting its effective length at the end of each inward movement of said weight to thereby permit a quick outward movement of the latter.

11. In a power transmission, the combination with revoluble members, one of which is formed with one or more radial guide-ways, a centrifugal weight movably mounted in each such guide-way, and a connection through which said second member moves said weight to the inner end of said guide-way, said connection including a crank and adjusting provisions operating automatically to permit said weight to move quickly outward when said crank is in or near a position at the opposite side of said axis from said weight.

Signed at New York city, in the county of New York, and State of New York, this 17th day of April, A. D. 1926.

CHARLES R. NICHOLS.